US009339950B2

(12) United States Patent
Allen

(10) Patent No.: US 9,339,950 B2
(45) Date of Patent: May 17, 2016

(54) REPROGRAMMABLE SHAPE CHANGE SHEET, USES OF THE SHEET AND METHOD OF PRODUCING A SHAPED SURFACE

(71) Applicant: Shane Allen, Joensuu (FI)

(72) Inventor: Shane Allen, Joensuu (FI)

( * ) Notice: Subject to any disclaimer, the term of this patent is extended or adjusted under 35 U.S.C. 154(b) by 235 days.

(21) Appl. No.: 13/888,403

(22) Filed: May 7, 2013

(65) Prior Publication Data

US 2014/0255534 A1   Sep. 11, 2014

(30) Foreign Application Priority Data

May 7, 2013   (FI) ..................................... 20135476

(51) Int. Cl.
| | | |
|---|---|---|
| *F03G 7/06* | (2006.01) | |
| *B29C 33/38* | (2006.01) | |
| *B29C 33/30* | (2006.01) | |
| *B29C 45/26* | (2006.01) | |

(52) U.S. Cl.
CPC .............. *B29C 33/38* (2013.01); *B29C 33/308* (2013.01); *B29C 33/3835* (2013.01); *B29C 45/26* (2013.01); *F03G 7/065* (2013.01)

(58) Field of Classification Search
CPC .................................. F03G 7/06; F03G 7/065
USPC ..................................... 60/527–529; 310/306
See application file for complete search history.

(56) References Cited

U.S. PATENT DOCUMENTS

| | | |
|---|---|---|
| 6,133,547 A | 10/2000 | Maynard |
| 6,161,382 A | 12/2000 | Brotz |
| 6,474,065 B1 | 11/2002 | Brotz |
| 8,057,206 B1 | 11/2011 | McKnight |
| 2001/0021290 A1 | 9/2001 | Ishida et al. |
| 2004/0015261 A1 | 1/2004 | Hofmann et al. |
| 2005/0148814 A1* | 7/2005 | Fischi ................... A61F 2/2481 600/37 |
| 2007/0034818 A1 | 2/2007 | Grummon |
| 2008/0302500 A1 | 12/2008 | Winkler |
| 2010/0007240 A1* | 1/2010 | Kornbluh ................. B64C 3/48 310/309 |
| 2010/0162109 A1 | 6/2010 | Chatterjee et al. |
| 2011/0041641 A1 | 2/2011 | Bennett |
| 2012/0119411 A1 | 5/2012 | Everhart et al. |
| 2012/0174571 A1 | 7/2012 | Villanueva et al. |

FOREIGN PATENT DOCUMENTS

| | | |
|---|---|---|
| GB | 2280957 A | 2/1995 |
| JP | 05057758 A   * | 3/1993 |
| WO | WO 9419051 A1 | 9/1994 |

* cited by examiner

*Primary Examiner* — Thomas Denion
*Assistant Examiner* — Mickey France
(74) *Attorney, Agent, or Firm* — Seppo Laine Oy

(57) ABSTRACT

The invention relates to a reprogrammable shape change sheet, a method of shaping a surface and a reprogrammable injection molding machine. The sheet comprises a plurality of muscle elements capable of changing shape upon electric stimulation, the elements being arranged in an array to define a surface. According to the invention, the muscle elements comprise two muscle material layers capable of changing shape upon electric stimulation and a flexible wiring layer sandwiched between the muscle material layers, the wiring layer being electrically connected to said muscle material layers for delivering electric stimulation signals to the muscle material layers for changing the shape of the muscle elements and further the topology of the surface. The invention provides a new shape change sheet structure, which can be made thin, accurate and durable for various uses.

17 Claims, 5 Drawing Sheets

REPROGRAMMABLE SHAPE CHANGE SHEET, USES OF THE SHEET AND METHOD OF PRODUCING A SHAPED SURFACE

FIELD OF THE INVENTION

The invention relates to a programmable shape changing structures. In particular, the invention relates to a novel kind of structure achievable utilizing for example shape memory alloys (SMA). The invention produces a novel kind of shape changing sheet or film, a method of shaping a surface and various uses for the sheet.

BACKGROUND OF THE INVENTION

Shape memory alloys (SMAs) have been used in many applications to deform objects for particular purposes. For example, US 2001/021290 discloses an omnidirectional flex-type shape memory alloy actuator for omnidirectional flexing of wire-like structures or capillary tubes when connected to driving elements. The actuator can be used for deforming optical fibers, for example.

WO 94/19051 discloses a spatially distributed SMA film, which can be used around a catheter tube, for example, in combination with a very large scale integrated circuit to achieve a bendable structure. Like the one discussed above, this design is also suitable for shaping (bending) tubular structures.

US 2011/041641 discloses a deformable robotic surface has a plurality of control points, a plurality of rigid connectors extending between the control points, and a covering extending over the plurality of control points. The control points are moveable relative to each other. Movement of the control points relative to each other causes a corresponding movement of the covering and a corresponding movement of the control point connectors. The document also discloses the use of deformable materials as a replacement for rigid connectors between the control points. However, even in such variation, the upwards and downwards movement of the surface is achieved using extendable tubes below the connector network and large control points. Such structure can potentially make versatile shapes of surfaces possible but results in a thick and complex structure.

U.S. Pat. No. 8,057,206 discloses a reconfigurable tooling surface relying on a similar principle with a plurality of actuators beneath a variable stiffness covering. The surface, when reshaped using the actuator columns in a soft state, can be used to facilitate a resin molding process in prototyping applications, for example. Like in US 2001/041641, the actuators are mechanical and have a very limited mechanical working range, which results in a complex structure with very tight constraints as regards possible shapes of the surface formed.

U.S. Pat. No. 6,474,065 takes another approach. It discloses a multijunction thermoelectric actuator utilizing a plurality of Peltier elements in connection with alternating strips of electrically conducting dissimilar materials in a grid configuration such that a sheet is formed. The sheet is deformable as a whole towards either one or another side thereof by applying electric power across the sheet, since one of the surfaces heats up and the other one cools down. Such structure has is very limited as concerns the potential shapes of the deformed surface.

U.S. Pat. No. 6,133,547 on the other hand discloses a unitary sheet of shape memory alloy and a distributed activation system comprising grid of heating elements for locally heating the SMA sheet. Such structure has also a relatively limited freedom of out-of-plane motion and suffers from creasing if bent to two orthogonal dimensions at one location.

In summary, the shape change structures discussed above are either specifically designed for bending tubular structures or, if capable of forming non-tubular surfaces with a desired topology, are very complex and/or limited in surface shape. They are therefore not well suitable for all applications, including prototyping and manufacturing, for example.

Currently, the most growing method in prototyping is 3D printing. This is a technology that uses a movable head, which extrudes molten plastic onto a sheet, in layers. These layers slowly build up after many thousands of passes, from bottom to top, to create a final prototype/product. This technology of 3D printing has many advantages. It is relatively cheap to use and to acquire. A 3D printer can print any object that you design and they also allow an engineer or designer the ability to manufacture their prototype product in house, which drastically improves final product launching by cutting time needed to go from manufacturer to them, eliminating the middle man. They can simply print out the product, hold it in their hands, decide on changes or if it is good, then proceed to get a real mold made which will produce the sellable product.

While 3D printing has many advantages it also has some disadvantages that are inherent to it's design. The major one is that it takes a very long time to print. Something as small as a computer mouse can take many hours for a decent quality print. For something as big as a car's bumper it can take many days up to even a week. Since a 3D printer is reliant upon stepper motors (for X, Y, and Z movement) and the cooling of the molten plastic before it can be printed on, it leaves a large flaw which will make it nearly impossible to speed up in the future. In other-words, 3D printing will most likely always be a slow process.

Another disadvantage of 3D printing is that it is not suitable for a final product. Even if sped up it can not compare in speed to an injection molding machine that can produce full made plastic parts in seconds. Injection molding is the major manufacturing method of plastic parts currently. It uses two or more pieces of metal which have an accurate image CNC (computer numerical control) carved in to them. These pieces of metal are put together and then molten plastic is forced into a mold formed by them. Once full of plastic, the mold is opened and the new plastic object is released.

Although the injection molding machine is super fast and accurate, it also has big disadvantages. Major disadvantage is that it is very costly. To have a small mold made can cost a few thousand euros or more. To have a car bumper mold made can cost over one million euros. These molds cannot be used for anything else besides the purpose the were made for either. Also, to have one of these molds made for a product can take several weeks or even months. Additionally, if the mold is incorrect, the entire mold needs to be redone, requiring even more money and time.

Thus, there is a need for novel shape change structures for prototyping and manufacturing applications, for example, to form a mold section with easily variable shape.

There is also a need for surface structures with more flexibly variable shape to be used in many other applications besides prototyping. There is a particular need for thin shape change structure.

SUMMARY OF THE INVENTION

It is an aim of the invention to provide a novel shape change structure solving at least part of the abovementioned problems.

A particular aim is to provide a sheet-form surface which can be flexibly shaped to predefined topologies using electronic control.

A further aim is to provide an injection molding machine which can be easily reprogrammed to produce different object shapes.

One aim of the invention is to produce a method of producing a surface with desired topology.

The invention is based on providing a programmable sheet, which can change its topology, i.e., form to a desired surface shape, with the aid of a plurality of muscle elements arranged in an array. Each of the muscle elements is connected to at least one another muscle element such that they together form a two-dimensional, typically initially planar grid defining a surface, which, upon shaping of individual elements by electrical stimulation, takes the desired form. The muscle elements preferably have a sandwich structure where a wiring layer, such as a flexible printed circuit board, remains between two layers of shape memory material (SMM) giving the self-shaping capacity to the muscle material. The electric stimulation signals can be delivered individually to the muscle elements via the wiring layer to adjust the shape of each element precisely.

More specifically, the invention is characterized by what is stated in the independent claims.

The sheet may be covered with an elastomer film, which encapsulates the array of muscle elements which are each programmable to certain shapes. To illustrate how the sheet could be used, a user can first create a 3D model of an object and import it into a sheet control computer program. The program is capable of taking the outside dimensions of the 3D model and to provide control signals for the sheet. Then, each one of the muscle elements of the sheet bend according to the control signals directed to that element. Once all elements have been programmed, the whole sheet has formed into the desired shape. In an injection molding application, the process can be continued by injecting plastic into a mold partly formed by the shaped sheet like a standard injection molder and a plastic object corresponding to the 3D model is made.

The muscle elements of the sheet are like pixels in a digital display. Every muscle element (pixel) has its own ability to change shape (colour) based on the digital 3D model (digital image) that it should reproduce.

The invention has considerable advantages. First, the sheet is fully shape programmable, i.e., it is able to shape to any programmed shape. The sheet can have high out-of-plane dislocation and therefore take various forms due to its element structure. The sandwich structure with two muscle material layers in each element reinforces the structure and the actuating circuit layer remains well shielded between the muscle material layers. The structure is also symmetrical in the thickness direction.

The sheet may have different curvature at different locations to individual control of muscle elements.

The disclosed structure provides high precision and a very long lifetime, even millions of repeatable precise shapes, provided that shape memory alloy is used as the muscle material. This is because other materials are not subjected to high stresses but they only follow the shape of the muscle material.

The sheet can be manufactured very thin, with a thickness less than 1 mm being completely realistic. The element structure makes possible to make arrays from muscle element strips, which provide a great degree of freedom of movement and avoid the problems of creasing.

Shape memory alloys allow a shaping precision down to nano-scale for individual muscle elements. This results in an extremely precise shape forming of the whole sheet.

For example, applied in injection molding the present shape change sheet can be used to define part of the mold, which is then easily reprogrammable in just seconds to the desired shape. After taking the programmed shape, it molds injected plastic into that shape, and in seconds it pops out your a plastic object. The next object may be of the same, slightly different or completely different shape. There is a huge potential in prototyping and quite possibly manufacturing with this technique. This method is quick, flexible, and inexpensive. The sheet can be made smooth and rigid, such that the quality of resulting objects is close to or the same as in conventional injection molding with prefabricated molds.

Selected embodiments of the invention are the subject of dependent claims.

According to one embodiment, the reprogrammable shape change sheet comprises a plurality of muscle elements arranged in an array and being capable of changing shape upon electric stimulation. The array of elements defines a surface, which initially is typically flat (planar) but changes upon electric stimulation. Each of the muscle elements comprises a flexible circuit board sandwiched between two muscle material layers capable of bending upon electric stimulation. The flexible circuit board comprises electrical conductors electrically connected to the muscle material layers for delivering electric stimulation signals to the muscle material layers for changing the overall shape of the surface through bending of individual elements.

The term "surface" (of the sheet) is herein used to describe a mesh surface formed by the faces of the individual elements and spanning segments connecting adjacent element faces to each other. In other words, any potential grooves or gaps between the muscle elements or muscle material layers are not taken into account. The sheet may even contain openings between the elements, although in a finished product, they are typically covered by a surface layer, as will be described below in more detail.

According to a preferred embodiment, the surface defined by the elements is essentially a planar surface when the elements are in a non-stimulated state, i.e. in their initial state. In a stimulated state, the surface may be curved towards one or the other side of the sheet, or locally to both sides.

In a preferred embodiment, the resulting sheet is self-supporting, i.e. does not need external mechanical support structures in order to maintain its programmed shape.

According to a preferred embodiment, the muscle material layers comprise shape memory material (SMM) layers, such as a shape memory alloy (SMA) layers. Common SMA materials include copper-aluminium-nickel and nickel-titanium (NiTi). The material may exhibit one-way memory effect or two-way memory effect.

The actuation of the shape change of the muscle material layers may occur through Joule heating (resistive heating) using electric stimulation signals such as current pulses through the circuitry between the layers, whereby no additional components are needed. There may, however, be provided heating or cooling components which are driven by the electric stimulation signals and transfer the desired temperature to the memory material.

According to one embodiment, the conductors in the circuit layer are capable of providing the electrical signals individually for said plurality of muscle elements. That is, each element may have a different temperature and therefore a different shape. The muscle material layers of different sides of the circuit layer are, however, preferably provided with the same stimulation signal and assembled such that the shape change occurs in the same direction and manner. Thus, each element is "powered" two co-operating "muscles".

The electrical conductors may be arranged so as to allow demultiplexing of individual signals, preferably of variable pulse width, to said muscle elements to program the sheet. Demultiplexing is beneficial, since it reduces the required wiring to minimum but still allows for fast programming of the sheet.

According to one embodiment, the two-dimensional muscle element array is formed by muscle element strips placed next to each other. Each strip comprises a plurality of muscle elements connected successively in a first direction, which preferably coincides with one of the main axes of the elements, typically the length axis in the case of elongated rectangular elements. There are provided a plurality of strips arranged side-by-side, i.e., successively in a second direction perpendicular to said first direction. In a further embodiment, the muscle elements of different strips are mechanically uncoupled by any rigid connecting means so as to allow deformation of the strips independently of each other. This embodiment allows for shaping of each individual strip independently of the neighboring strip (a potential flexible surface material covering all elements and therefore necessarily coupling the elements in the second direction too is neglected here).

According to one embodiment, there is provided a rigid supporting structure, i.e., frame, to which the elements or element strips are connected. Preferably the strips are connected at both ends thereof to the rigid supporting structure by flexible, preferably elastic connectors. The connectors hold the sheet in place while allowing the individual elements and strips to take the programmed shape. Electric wiring to the elements may be provided through conducting material arranged on or into said connectors.

According to one embodiment, the muscle material layers are electrically connected to the electric conductors of the flexible circuit board using flexible connecting means, such as with conductive adhesive, electroplating or clipping. Flexible connecting is of importance to ensure that the electrical connection to the muscle material remains good even after several shape changes. Rigid connecting, such as soldering, may result in wear and breaking of the connection at the interface zone between the circuit board and the muscle material.

According to one embodiment, there are provided a plurality of skeleton elements adapted to support the sandwich structure of the muscle elements by holding the muscle material layers and the flexible circuit board together. The skeleton elements are preferably elongated clips extending perpendicularly to the bending direction of the muscle material layers. There may be a plurality of skeleton elements spaced from each other on each muscle element. Such a skeleton system improves the shaping precision and durability of the sheet.

According to one embodiment, there are provided means for preventing heat flux to the muscle material layers from the outside of the sheet and/or for actively cooling the muscle elements. Such means may comprise e.g. a thermal insulation layer and/or a fluid circulation system provided on one or both sides of the muscle elements. Such arrangement may be beneficial in some embodiments, where the sheet is subjected to varying temperatures, such as in injection molding.

According to one embodiment, there are provided two layers of muscle elements arranged on top of each other and in different directions. Thus, the sheet actually comprises two sub-sheets. The term "different directions" herein means that the characteristic bending or deformation directions of the elements aligned with each other in different sheets are not the same. According to a preferred embodiment, the sub-sheets comprise oriented elements having a programmed bending direction and are essentially similar but placed in 90 degrees angle with respect to each other, as concerns the orientation of the elements. Such sheet allows for equally diverse and smooth shapes irrespective of the direction on the sheet surface.

As briefly mentioned above, in one embodiment there is provided a unitary flexible material layer covering the individual muscle elements on at least one side of the muscle elements. There may be such layer on both sides of the sheet. The covering layer smoothens the sheet surface, since there may initially be ridges and/or grooves due to spacings between the muscle elements and/or muscle material layers and/or the potential skeleton system. The properties of the covering layer are chosen to allow for shaping of the sheet (i.e. small mechanical stiffness/rigidity compared with the internal deforming forces of the sheet provided by of the muscle elements) but still providing a surface stiff and stable enough for the particular purpose of use of the sheet (i.e. mechanical stiffness/rigidity high compared with the external forces exerted on the sheet). The covering material may be e.g. rubber or other polymer material.

Besides smoothening, the covering layer or layers reinforce the sheet structure. The covering layer may be attached to the muscle elements and/or the wiring layer and/or the covering layer on the other side of the sheet using flexible adhesive, for example.

The starting shape of a covered sheet is preferably completely flat and it looks like a piece of the covering material. When programmed the sheet pops up into a shape.

According to one embodiment, the sheet comprises an electrical control unit or an electrical connector for a control unit for providing the electric signals to the muscle elements for shaping the shape change sheet to the desired form. The control unit or the connector is preferably capable of providing pulsed demultiplexing signal to the array of muscle elements.

According to one embodiment, the complete sheet, including any potential covering layers, has a thickness of 5 mm or less, in particular 2 mm or less, preferably 1 mm or less. The thickness can be reduced down to nano-scale, i.e., to dimensions below 1 µm.

The muscle elements may have a rectangular in-plane footprint, typically with an in-plane aspect ratio varying from 1:1 (square) to 20:1 (wire-like). Preferably, the elements are elongated, having an aspect ratio of at least 3:1.

The largest dimension of the individual elements may be e.g. 0.5 mm-5 cm. Typically, all the elements in a single sheet are of the same size, but there may also be elements of different sizes. There may also be non-deformable elements within a sheet, replacing one or more muscle elements of the array.

There is also provided a shape change element for use in a reprogrammable shape change sheet, the element comprising a wiring layer sandwiched between to layers of shape memory material and the wiring layer comprising electrical conductor means for providing electric stimulation current to the memory material layers for initiating shape change of the element.

According to one aspect of the invention, independent from the particularly advantageous muscle element structure described above, there is also provided a shape change sheet comprising muscle elements of the above or some other kind, the muscle element being capable of changing shape upon stimulation and wherein the muscle elements are arranged as strips each comprising a plurality of muscle elements connected successively in a first direction, and there are provided a plurality of strips arranged successively in a second direction perpendicular to said first direction. The strips contain electrical wiring for delivering electronic stimulation signals to the muscle elements for changing the shape of the element and further the general topology of the sheet formed by the element strips. This aspect of the invention is compatible with other embodiments of the invention and may be prosecuted in a divisional application, for example.

According to one embodiment, the present method of producing a surface with a predefined shape comprises providing a reprogrammable shape change sheet for example according to one of the embodiments described above and delivering electric stimulation signals according to a signaling scheme corresponding to said predefined shape to said muscle elements to change the shape of the individual muscle elements. As a consequence, the surface defined by the muscle elements takes the predefined shape.

According to one embodiment, there is provided a programmable injection molding machine comprising a mold cavity and means for injecting moldable material to the mold cavity for forming an object whose shape corresponds to internal shape of the mold cavity. According to the invention, at least part of the mold cavity is defined by a reprogrammable shape change sheet comprising a plurality of muscle elements each comprising a flexible circuit board sandwiched between two muscle material layers capable of changing shape upon electric stimulation and being arranged to define a surface, and wherein the flexible circuit board comprises electrical conductors electrically connected to said muscle material layers for delivering stimulation electric signals individually to the muscle elements for changing the shape of the surface.

The machine may comprise means for storing a 3D model of at least part of the object in computer readable form and means delivering electric stimulation signals to the reprogrammable shape change sheet in order to shape the sheet to correspond with the shape of the 3D model.

The term "muscle material" refers to a unitary piece of material having the capability of reversibly changing shape in suitable conditions without external mechanical force directed to the material. Such materials include shape memory materials (SMMs) of different kinds, in particular shape memory alloys (SMAs), but also shape memory polymers (SMPs) may be used.

The term "muscle element" refers to any element capable of internally producing a mechanical force which causes the element to change its shape upon suitable stimulus. A muscle element may consist of multiple parts, such as layers, as described below in more detail. A muscle element typically comprises one or more separate units of muscle material. The required stimulus for the muscle element and muscle material is primarily electric, but a converting element, such as a heating or cooling element or an electromagnet can be used within the element to convert electric energy some other form for the muscle material, if necessary.

The term "wiring layer" means a structure which is capable of delivering an electrical stimulus to the muscle material for initiating its shape change. The "wiring layer" may also serve so as to mechanically and/or electrically and/or thermally isolate layers of muscle material from each other. In a simple form, a wiring layer comprises a flexible printed circuit board (PCB) known per se, and having suitable copper wirings on one or both sides thereof and/or in an internal layer thereof for delivering the stimulus signals from the outside of the sheet into the elements of sheet and contact pads on one or both surfaces thereof for transferring the signals to the muscle material.

Next, embodiments, advantages and further uses of the invention are described in more detail with reference to the attached drawings.

DETAILED DESCRIPTION OF EMBODIMENTS

Figure 1:
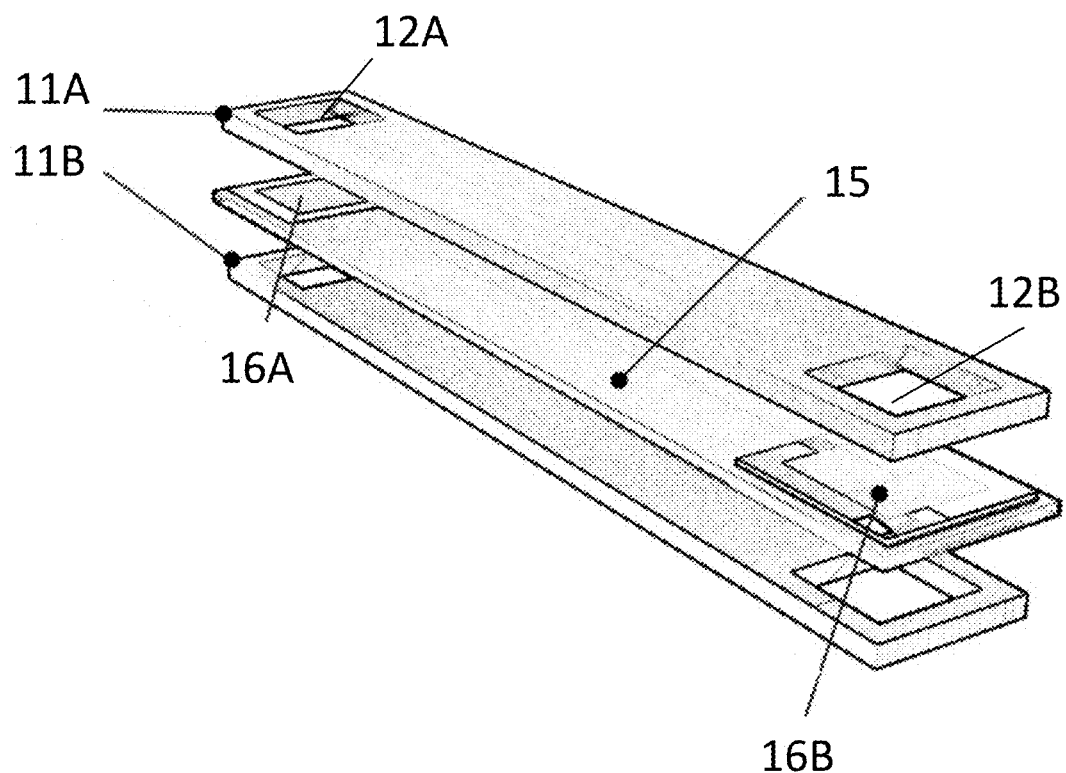
FIG. 1 shows a perspective exploded view of a muscle element according to one embodiment of the invention.

With reference to FIG. 1, a muscle element usable in a reprogrammable shape change sheet according to one embodiment of the invention comprises two planar rectangular muscle material layers 11A, 11B and a wiring layer 15 arranged between the muscle material layers 11A, 11B. The wiring layer 15 comprises electrical contact pads 16A, 16B on both ends thereof and on both sides thereof. The muscle material layers comprise apertures 12A, 12B on corresponding locations on ends thereof. The apertures 12A, 12B are beveled towards the outer surfaces so that conductive adhesive polymer, for example, may be used to effectively bind and connect the muscle material layers to the contact pads 16A, 16B.

Figure 2:
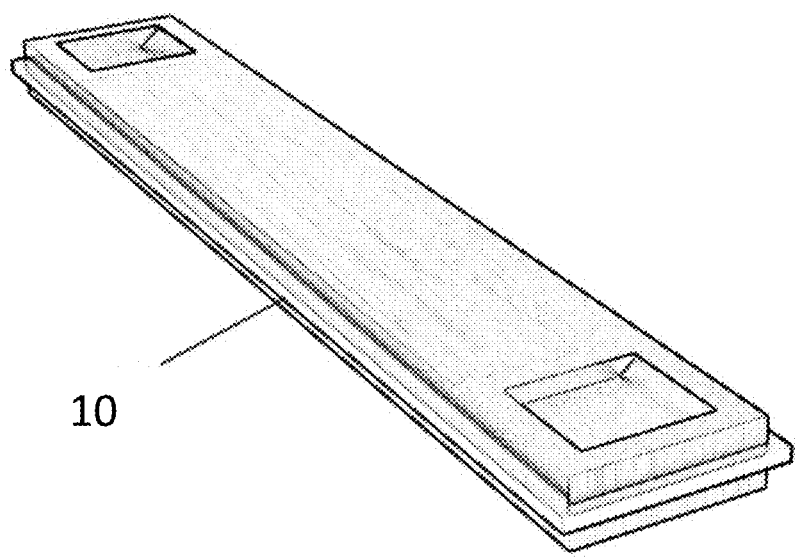
FIG. 2 shows a perspective view muscle element of FIG. 1 in assembled state.

FIG. 2 shows a muscle element 10 assembled. The middle portion of the muscle element on both sides thereof is preferably left without adhesive so that the structure is as a whole as flexible as possible. The end portions are bound using non-rigid means to allow for bending of the structure without breaking the electrical connections. It is also advantageous that the ohmic programming current delivered via the wiring layer 15 and driven through the muscle material layers flows through the whole layers 11A and 11B, whereby heat is evenly generated.

Provided that the muscle material layers are suitably preprogrammed memory materials, the unit 10 is able to bend forwards and backwards.

The wiring layer may be formed of a flexible printed circuit board (PCB) material known per se. Flexible PCBs a used for making electrical connections across hinges or other movable parts of electronic devices. Alternatively, and especially in the particular case where the muscle material exhibits contraction instead or in addition to bending, elastic material containing elastic conductive wirings can be used. In both cases, the wiring layer is preferably polymeric. The conductive paths and contact pads on the wiring layer may be made from metal, such as copper or conductive polymer or ink, to mention some examples.

Not considering the potential covering layers or temperature control means provided onto the sheet, the wiring layer may be the only structure mechanically connecting neighboring muscle element to each other. On the hand, there may be provided one or more elastic reinforcing members to ensure durability and rigidity of the sheet.

Muscle material is preferably connected to leads or connection pads on the PCB by clipping, electroplating, conductive adhesive (glue/epoxy), or other similar low-temperature bonding methods. This is needed due to the muscle materials generally being unable to retain programming if heated to high for example by soldering. Some materials may be completely ruined if heated too high. It has also been found that at least nickel-titanium can hold solder or some other hard adhesives poorly due to its constant expansion and movement as well as its chemical makeup. Clipping, electroplating, and/or conductive glue/epoxy provides a flexible and strong connection and conducts electricity for long durable periods as well as, therefore solving this issue with heat and the problems with materials not able to stick to the muscle material.

According to one embodiment, the muscle elements are capable of bending in their length direction forwards and backwards. The memory material layers must be preprogrammed to allow such behavior. In another embodiment, the muscle elements are capable of bending in only one direction, whereby the array may be organized such that every second element is a forward bending one and every second a backwards bending one in order to allow all topologies to be produced.

Figure 3:
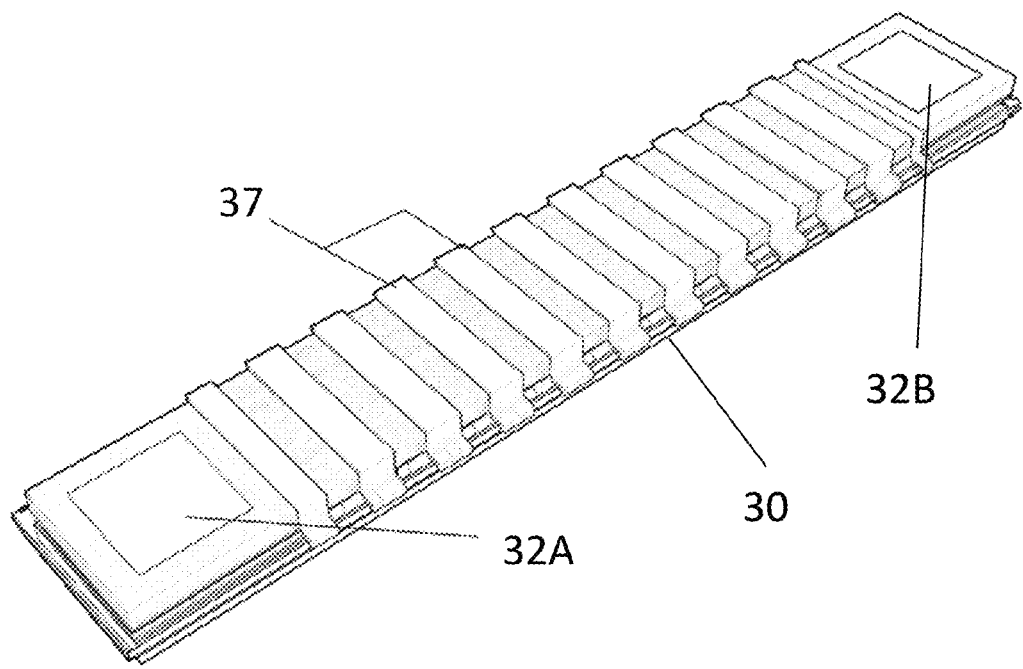
FIG. 3 illustrates a perspective view of a muscle element provided with a skeleton system.

FIG. 3 shows a version of a muscle element 30 with skeleton elements 37. The conductive adhesive zones at the ends of the muscle element 30 are denoted with reference numerals 32A and 32B. The primary function of the skeleton system constituted by the skeleton elements 37 is to hold the muscle material to the flexible wiring layer. The skeleton elements 37 may be for example plastic or metal clips or strips adapted to grab to the wiring layer or to the muscle material layer on the other side of the element.

Typically, the shape changing of the element is possible by using muscle material capable of bending upon electrical input, also called "muscle wire", made from metal alloy, for example of a mixture of nickel and titanium. In this case, the skeleton elements hold the parts of the sandwich structure tightly together even during bending without restricting its movement or suffering from movement-induced stresses, unlike a complete adhesive bonding would do.

Alternatively, other muscle type materials which contract upon electrical power input may be used. In this case, the contraction can be converted into bending of angles using the skeleton system.

The muscle material used is typically either wire or a flat stock or sheet of muscle material, which is then etched into shape required. In a simple embodiment, the shape is a rectangular shape with electrical connection apertures symmetrically on two ends. The connection apertures may be replaced by other electrical connection means capable of being clipped, electroplated or glued to the wiring layer using conductive adhesive.

Figure 4:
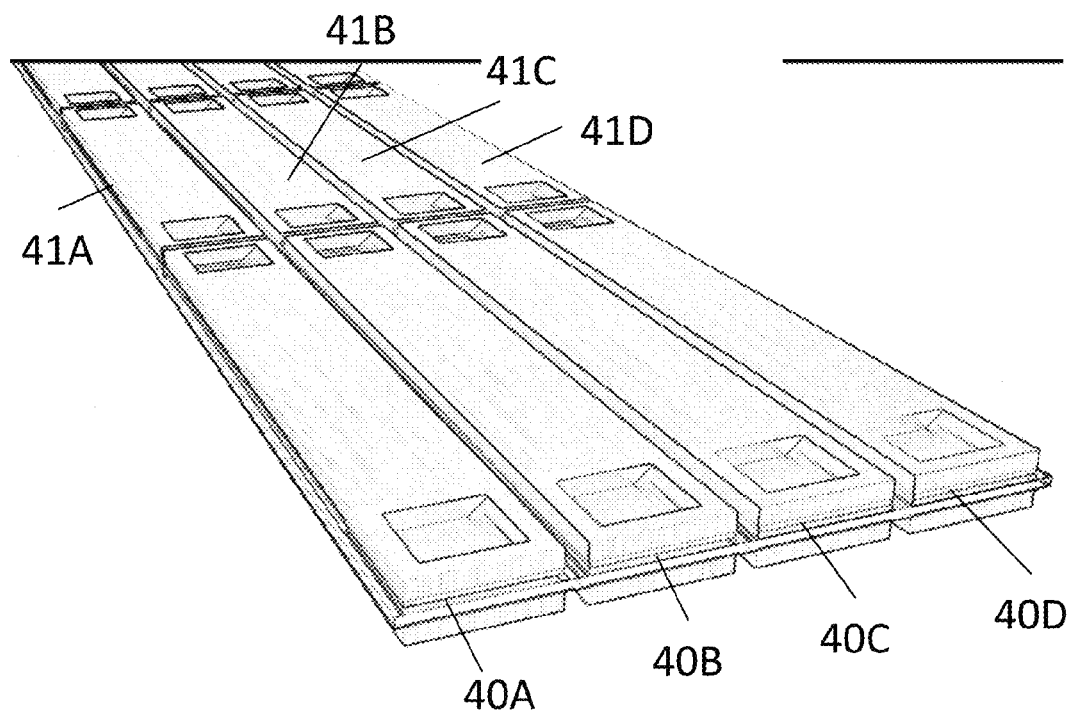
FIG. 4 shows a perspective view of a two-dimensional array of muscle elements forming a sheet according to one embodiment of the invention.

FIG. 4 illustrates an array of muscle elements 40A-D, 41A-D, placed side-by-side in both width and length directions. In this example, the wiring layer is common to all elements, but the muscle material layers between neighboring elements are separated by a gap to allow individual stiulation and movement.

Figure 5:
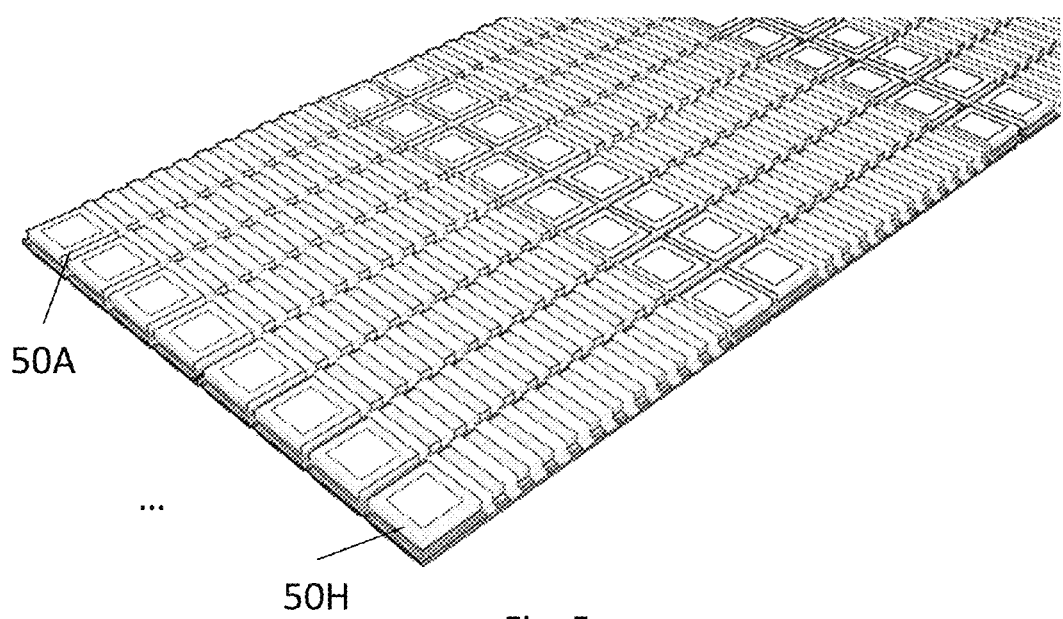
FIG. 5 shows a perspective view of a two dimensional array of muscle elements with skeleton systems according to one embodiment of the invention.
Figure 6:
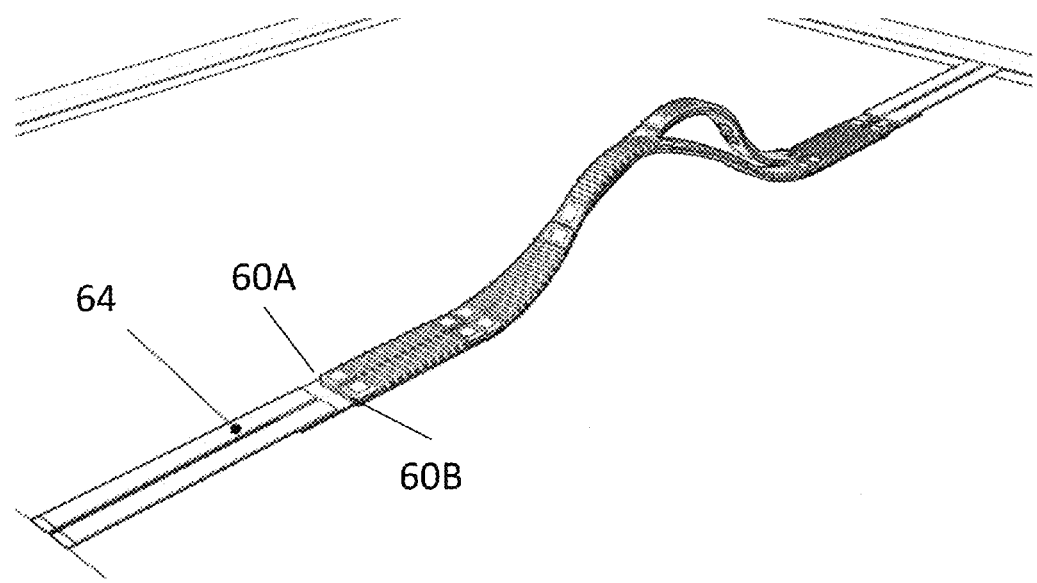
FIG. 6 illustrates a perspective view of a section of a sheet formed using muscle element strips.

FIG. 5 shows also an array of muscle elements being provided in the form of muscle element strips 50A-H adjacent to each other. Each of the strips 50A-H contains a plurality of muscle elements arranged successively in longitudinal direction (end-to-end). Each strip comprises a common witing layer strip but neighboring strips use different wiring layer strips. Each of the strips is individually programmable, i.e. separate and independently free forming from every other strip. This is illustrated more clearly in FIG. 6, showing two strips 60A, 60B. As can be seen, a strip is a long set of muscle elements placed together. These can be made as long or short as needed. When strips are placed side by side they create a sheet.

These strips and sheets can be laid on top of each other in different angles to allow for a more precise forming sheet. This solves many problems for forming shapes in comparison to using one large array of elements or strips that are each interconnected in two dimensions. Using this kind of a fully connected array (such as that of FIG. 4) is workable to some level but creates problems for edges where the sheet would crease (like when placing cloth over a square, the edges crease over). Utilizing individual strips within a sheet, and potentially stacking two or more such layers on top of each other at different angles, allows shape forming without any creasing.

As shown in FIG. 6, at the end of the strips there are flexible material zones 64, used to connect to a frame, in order to allow true movement of the strips to form into shapes. When the strips form a shape, they pull in the flexible material. This allows large movement area and large distance capabilities from the sheet. Without this flexible material at the ends, the strips are locked and unable to move (for example if rigidly fixed to the frame).

A uniform elastic surface layer placed on top of the strips such that the entore sheet is covered makes the surface of the sheet smooth and keeps strips aligned properly, i.e., organizes all strips.

Many memory materials are actuated using electric current, which is driven trough the material having non-zero resistivity and therefore heats the material and makes it take a preprogrammed shape corresponding to the prevailing temperature. There are, however, also other means for achieving the required temperature, such as using electrically driven separate heaters or coolers based e.g. on Peltier effect. The term "electric stimulation" covers all such methods irrespective of whether direct "Joule heating" or indirect heating is used.

The electric stimulation is preferably achieved by demultiplexing, i.e. pulsing the elements electrically one or several at a time according to a predefined pulsing scheme. For example, each element can be formed is formed to the desired shape by selecting a suitable pulse width. A neighboring element may be subjected to a shorter or longer pulse. Higher pulse width enables higher degrees of angles, lower pulse width allows lower degrees of shape change. This allows many different precise settings of angles. Alternatively or in addition to that, pulse voltage or current may be varied. Demultiplexing can be continued as long as needed to achieve and maintain the desired shape of the film. Demultiplexing also allows the ability of lower power consumption compared to powering fully each element.

A suitable wiring pattern allowing demultiplexing can be relatively easily designed to the wiring layer or wiring strips.

A watertight elastic film on top of the sheet makes the design waterproof and weatherproof and thus contributes to the long life cycle of the sheet.

Figure 7:
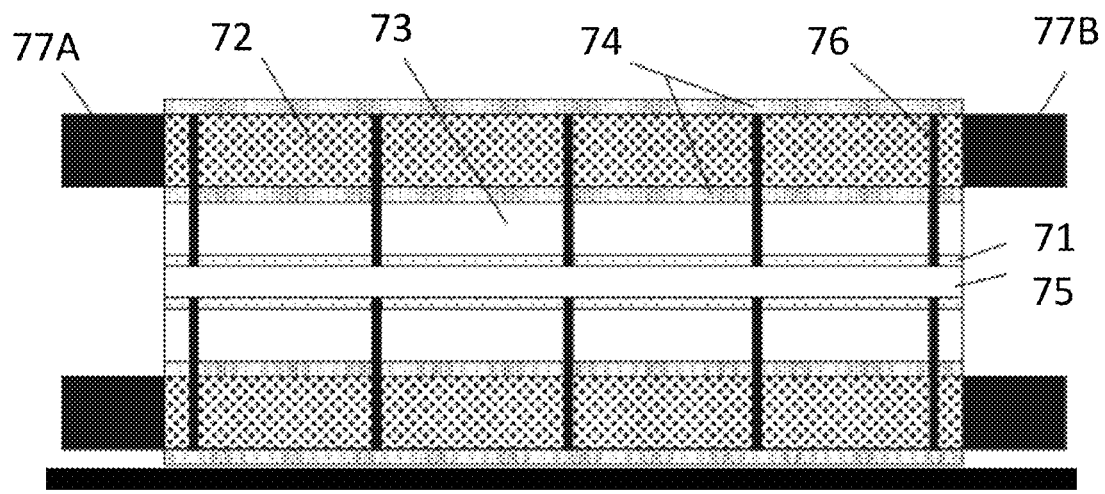
FIG. 7 shows a cross-sectional side view of a muscle unit provided with a temperature control system.

In case high temperature stability and/or protection against external temperature changes is needed, there may be provided insulating means or means for actively controlling the temperature of the film. FIG. 7 shows one implementation. In general, there is provided a system comprising a layer of air or vacuum on both sides of the sheet, and then additionally on top of that layer, a layer of cooling liquid which have forced fluid convection, for example using pump(s), which can be placed at the sides of sheet connected to the frame. In more detail, there is a wiring layer 75 sandwiched between muscle material layers 71. Next, on both sides symmetrically, the is an air/vacuum gap 73. The gap 73 is limited by a fluid channel 72 defined between elastic material layers 74, one of which forms the surface of the film and one of which is against the air gap. The fluid channel 72 is connected at one end to a fluid input 77A and at the other end to a fluid output 77B. The fluid may be directed to a next muscle element (not shown) connected in series with the element shown. There are also provided rigid support members 76, which prevent the temperature control system from collapsing and help to retain the thickness of the film uniform also when in bent state. The proposed structure has ability to withstand extremely high temperatures.

Figure 8:
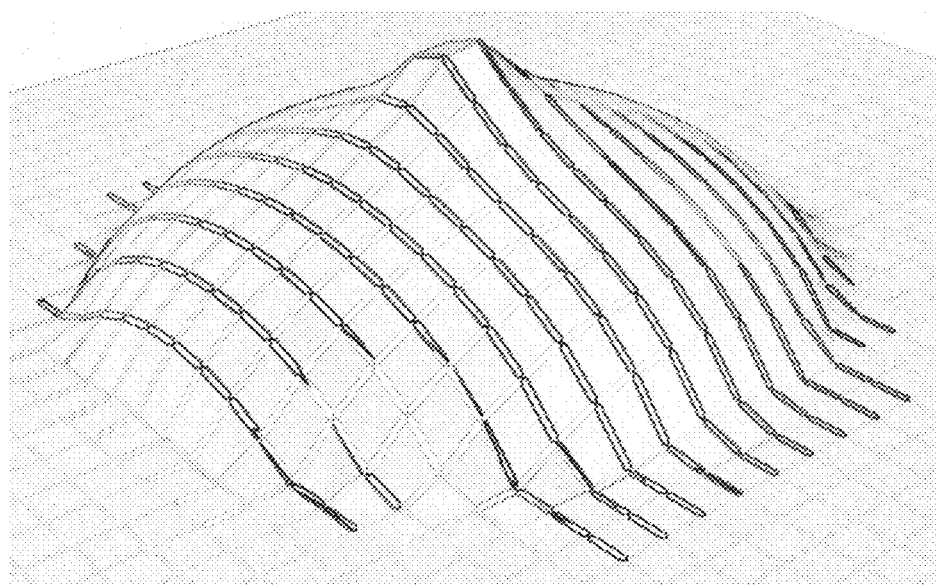
FIG. 8 shows a perspective view of a programmable sheet programmed into a non-planar shape.

As briefly referred to above, according to one embodiment, a finished sheet comprises two sheets, preferably of the strip design described above placed on top of each other, the top sheet preferably being at a 90 degree angle to the bottom sheet. FIG. 8 illustrates such design and also shows the film in shape-programmed state. The muscle elements on the different sheets form a complete square grid with nodes at the end points of the muscle elements. Then, on the outside, i.e. top and/or bottom of the resulting double sheet, a elastic film/sheet material is affixed such that is spans over the regions between the muscle elements over the whole grid and forms a uniform surface for the sheet. This, in combination with the double-sheet structure, allows very smooth shapes to be created. The proposed two-layer sheet design also differs from designs in which have muscle material arranged in two directions in a single layer.

It is also possible for many other variations to be made in addition to those described above. For example, the sheets need not be at 90 degrees angle with respect to each other, but a smaller angle may be used, or there may be provided more than two sheets on top of each other.

Figure 9:
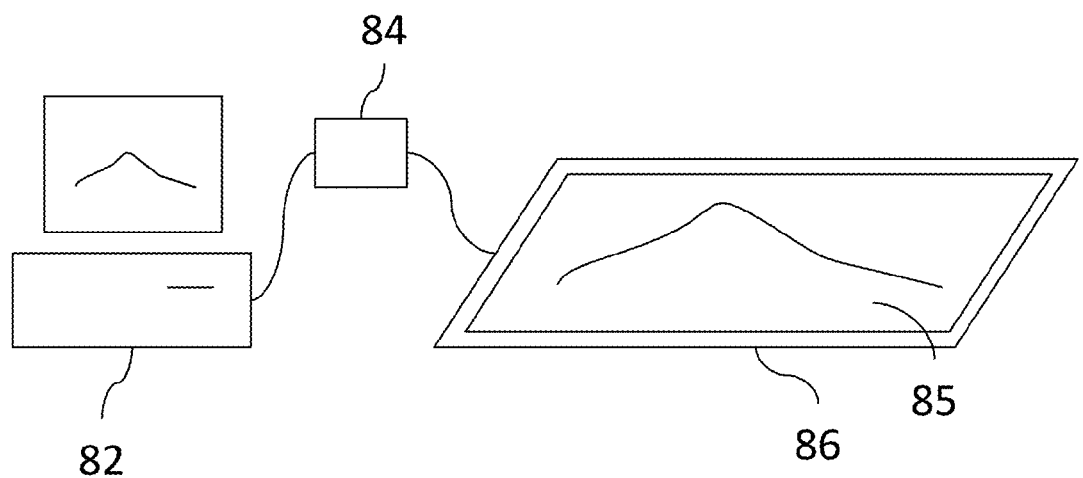
FIG. 9 is a schematic illustration of a reprogrammable sheet according to the invention connected to a shape control system.

FIG. 9 shows a reprogrammable sheet 85 attached to a frame 86. The sheet is connected to a control computer 82 via a control unit 84, preferably a demultiplexer unit. The computer 82 comprises a software capable of reading a digital 3D model in a suitable format and converting it to demultiplexing instructions for the demultiplexing unit 84, which further converts the instructions into electrical shaping signals transferred to the muscle elements of the sheet 85 by multiplexing. The control unit 84 may be a separate unit or integral with the computer 82 or the frame 86.

Application Areas

The present invention has numerous areas of application due to its programming ability to an infinite amount of shapes and scalability to almost any size needed. Some of the areas are briefly introduced below.

Injection Molding

The sheet can be used as a part of a programmable injection molding machine. In particular, utilizing a double sheet design described above and active temperature control system, it can form shape and have molten plastic (or even metal) injected inside of it to create a plastic (or metal) part. The whole injection mold or only part of it may be formed by the present sheet and there may be a plurality of sheets programmed in co-operation to achieve the desired form of the mold.

Figure 10:
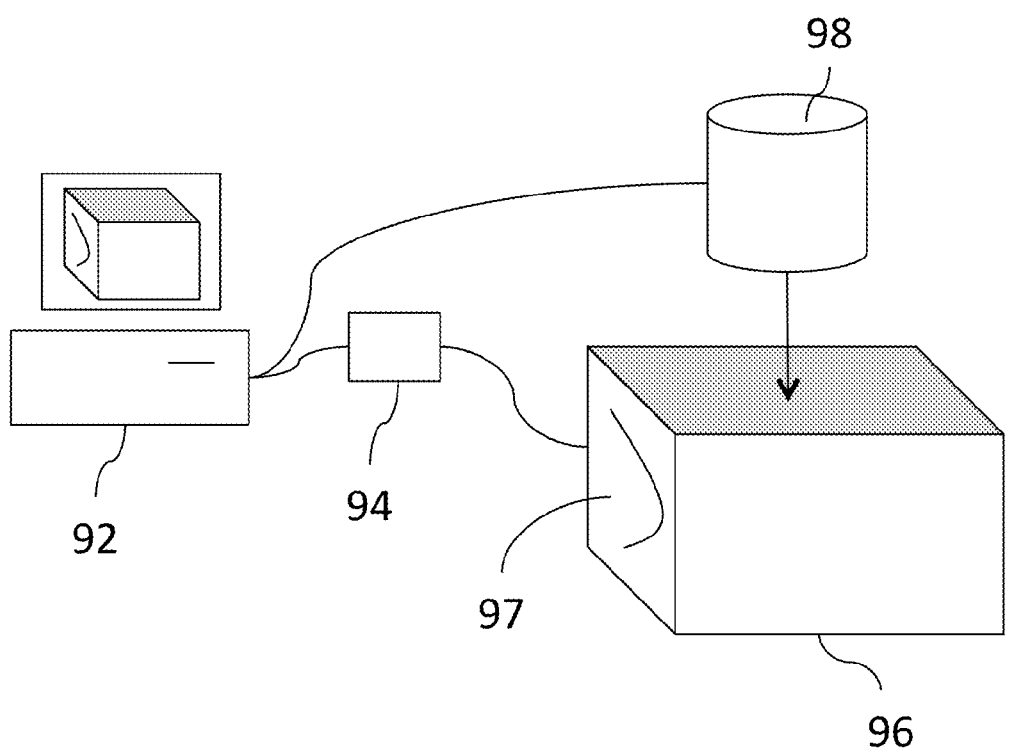
FIG. 10 is a schematic illustration of shows injection molding instrumentation according to one embodiment of the invention.

FIG. 10 shows a system with an injection mold 96, i.e, mold cavity. A section 97 (one wall of the box-shaped mold 96) is formed by a sheet according to the invention. The shape of the sheet can be controlled with a control computer 92 to correspond to a 3D model of the object to be produced and an electronic control unit 94 in the same way as described with reference to FIG. 9 and other related passages above. The control computer 92 (or another control unit) is also connected to a material feed system 98 for feeding molten material to the mold to produce an object having the programmed shape.

Fiber Molding

The sheet can be used as part of a fiber molding machine used e.g. for shaping fiberglass, kevlar, carbon fiber objects or composite material objects. The sheet is used to forming a desired shape and then fiber may be laid into the shape.

Shaping of Screens

The present sheet can also be used behind a flexible screen, such as an OLED, LED, projection, phone, tablet or laptop screen. The sheet is able to bend or morph the surface into a desired shape or visualize an image on the screen. This creates a true 3D image or shape.

Individual light emitting units, such as LEDs can also be placed on the surface of the sheet to create large multiplexed displays without a need for a separate flexible screen.

Currently special glasses to have a 3D effect in television or computer is are used. They are, however, annoying to wear and often also of bad quality. With new technologies such as flexible LCD screens coming onto market, the present sheet can be used to create real 3D TV or computer display where the objects on the screen really do "pop out" at you. This provides real "depth" into the scene.

Shaping of Vehicle Parts

The sheet can be used as vehicle (car, boat, plane) panel or parts in order to allow programmable/reprogrammable forms/shapes. This may be desirable for aesthetic reasons or to repair (bounce back) from damage.

Design and Visualization

The sheet can be used for visualization of design or engineering works, i.e. for allowing users to view a product from 3D software in actual real life dimensions without producing a prototype. Thus, the sheet is ideal for shape memory alloy aided architecture (SMAAD). The 3D object can literally pop out from a desk or floor and allow viewing of an object very simply. This is just like a hologram in the traditional sense, popping out of the desk in front of you. This can even be coupled with flexible LCD screens, for example, for many more uses.

Assistive Technologies

The sheet can be used in connection with assistive technologies such as braille, for visually impaired persons.

Advertisement

The sheet is suitable for advertising on TV, billboards, posters, tables, and other flat or curved surfaces. This allows an advertisement or product to pop from the surface to grab attention. Objects can even rotate or move in front of the customer.

Aerodynamics

The sheet can be used for aerodynamic solutions which require a surface to form into many different shapes. This is useful e.g. in racing, in which there is a need to have both braking power (downforce) and aerodynamics. If there is more aerodynamics then its harder to brake and visa versa. The present reprogrammable sheet may be used to provide aerodynamics when needed and braking power when needed.

Cellphones

One of the problems with cellphones currently is the absence of tactile feedback, making it hard to type with the "keys" of a flat touchscreen. With flexible LCD screens, the present sheet may be placed behind the screen for allowing letter keys which can be touched and felt to pop up. Similarly, many other tactile and visual effects can be produced.

Creation of Electronic Devices

The concepts of the present invention and embodiments can be utilized to create electronic devices, such as phones, tablets and computers, which can change shape and deform. For example, when traveling or transporting a device it may be desirable for a portion or the entire electronic device to change shape in order to be more compact or to fit a desired shape which is conducive for travel and/or storage. Once the device is to be used then it can assume its' intended larger shape.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A reprogrammable shape change sheet comprising;
    a plurality of muscle elements capable of changing shape upon electric stimulation, the elements being arranged in an array to define a surface,
    wherein said muscle elements are mechanically interconnected to each other and each has two muscle material layers capable of changing shape upon electric stimulation and a flexible wiring layer sandwiched between the muscle material layers, the flexible wiring layer being electrically connected to said muscle material layers for delivering electric stimulation signals to the muscle material layers for changing the shape of the muscle elements and further the topology of the surface,
    electrical contact pads on both ends of the flexible wiring layer, and
    a plurality of elongated clips extending perpendicularly to a bending direction of the muscle elements, said elongated clips adapted to support the sandwich structure of the muscle elements by holding the muscle material layers and the wiring layer together.

2. The shape change sheet according to claim 1, wherein the muscle material layers comprise shape memory material (SMM) layers.

3. The shape change sheet according to claim 1, wherein the wiring layer is common to more than one muscle element and comprises electrical conductors capable of providing said electric stimulation signals individually for said plurality of muscle elements.

4. The shape change sheet according to claim 3, wherein the electrical conductors are arranged so as to allow demultiplexing of individual signals to said muscle elements to program.

5. The shape change sheet according to claim 1, wherein
    the muscle elements are arranged as strips each comprising a plurality of muscle elements connected successively in a first direction, and
    there are provided a plurality of strips arranged successively in a second direction perpendicular to said first direction.

6. The shape change sheet according to claim 5, wherein the muscle elements of different strips are mechanically uncoupled by any rigid connecting means so as to allow deformation of the strips independently of each other.

7. The shape change sheet according to claim 5, wherein the strips are connected at both ends thereof to a rigid supporting structure by flexible connectors.

8. The shape change sheet according to claim 5, wherein the strips are sufficiently narrow and spaced apart such that the sheet is at least partially transparent.

9. The shape change sheet according to claim 1, wherein the muscle material layers are electrically connected to electric conductors on the wiring layer using flexible connecting means.

10. The shape change sheet according to claim 1, wherein there are provided a plurality of skeleton elements adapted to support the sandwich structure of the muscle elements by holding the muscle material layers and the wiring layer together.

11. The shape change sheet according to claim 1, wherein there are provided means for preventing heat flux to the muscle material layers and/or for actively cooling the muscle elements.

12. The shape change sheet according to claim 1, wherein there are provided two layers of muscle elements arranged on top of each other and in different directions.

13. The shape change sheet according to claim 1, wherein there is provided a unitary flexible material layer covering the individual muscle elements on at least one side of the muscle elements for smoothening the surface of the shape change sheet.

14. The shape change sheet according to claim 1, further comprising an electrical control unit or an electrical connector for a control unit for providing the electric signals to the muscle elements for shaping the shape change sheet to the desired form.

15. The shape change sheet according to claim 1, wherein the muscle elements have a rectangular in-plane footprint.

16. A programmable injection molding machine, comprising;
a mold cavity,
means for injecting moldable material to the mold cavity for forming an object whose shape corresponds to internal shape of the mold cavity,
wherein at least part of the mold cavity is defined by a reprogrammable shape change sheet having a plurality of muscle elements mechanically interconnected to each other and each having a flexible wiring layer sandwiched between two muscle material layers capable of changing shape upon electric stimulation and being arranged to define a surface, and
wherein the flexible wiring layer has electrical conductors electrically connected to said muscle material layers for delivering stimulation electric signals individually to the muscle elements for changing the shape of the surface,
electrical contact pads on both ends of the flexible wiring layer, and
a plurality of elongated clips extending perpendicularly to a bending direction of the muscle elements, said elongated clips adapted to support the sandwich structure of the muscle elements by holding the muscle material layers and the wiring layer together.

17. The programmable injection molding machine according to claim 16, further comprising means for storing a 3D model of at least part of the object in computer readable form and means delivering electric stimulation signals to the reprogrammable shape change sheet in order to shape the sheet to correspond said 3D model.

* * * * *